Sept. 5, 1944. L. O. VINSON 2,357,711

SHEET METAL FASTENER AND HOLE ALIGNER

Filed March 17, 1943

INVENTOR.
Loren O. Vinson
BY Fred C. Matheny
ATTORNEY.

Patented Sept. 5, 1944

2,357,711

UNITED STATES PATENT OFFICE 2,357,711

SHEET METAL FASTENER AND HOLE ALIGNER

Loren O. Vinson, Seattle, Wash.

Application March 17, 1943, Serial No. 479,533

5 Claims. (Cl. 85—2.4)

This invention relates to a sheet metal fastener and hole aligner of the type adapted for insertion through registering rivet holes in two or more sheets of material, such as sheet metal, to properly align the said rivet holes and to firmly clamp the sheets of material together.

It is an object of this invention to provide a sheet metal fastener for use in registering holes in two or more sheets of metal which is adapted to be expanded into engagement with the walls of the holes through which it passes, as contrasted to devices of this type which have hook like portions that engage with the innermost surface of the inner sheet of metal.

Another object of the invention is to provide a sheet metal fastener of this type in which a slightly tapered rotary cam is used to expand sheet metal engaging members or resilient clamping jaws within holes in the sheet metal.

For the purpose of this description this device is referred to as a sheet metal fastener and hole aligner but it will be understood that said device may be used in connection with non-metallic sheets.

This device is of great utility in airplane construction wherein any number of these devices may be inserted and expanded in the registering holes in overlapping sheets of metal to bring the holes in the several sheets into accurate alignment and at the same time secure the several sheets together.

Further objects are to provide a sheet metal fastener that is simple in construction, easy to manipulate, efficient in operation and not expensive to manufacture when produced in quantities.

Other objects of this invention will be apparent from the following description taken in connection with the accompanying drawing.

In the drawing

Figure 1 is a side elevation on an enlarged scale of a sheet metal fastener constructed in accordance with my invention.

Figs. 2 and 3 are top and bottom plan views respectively of the same looking in the directions of the arrows 2—2 and 3—3 of Fig. 1.

Like reference numerals designate like parts throughout the several views.

Figure 6:
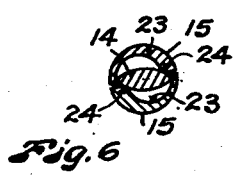
Fig. 6 is a sectional view taken substantially on broken line 6—6 of Fig. 4.

This device comprises a housing formed of two parts 10 and 11 held together by snap rings 12 which are split so the device can be readily assembled and disassembled. A rotatable plug 13 having a cam blade 14 thereon is rotatively mounted in the housing 10—11. Two semi-tubular members 15 of resilient material, such as spring steel, form a split tube around the cam blade 14. These tubular members 15 have their inner surfaces shaped as shown in Fig. 6 to form cam surfaces 23 so that said members 15 will be expanded by rotary movement of the cam blade 14.

Stop members 24 are provided in connection with the cam surfaces 23 for the cam 14 to stop against.

Figure 7:
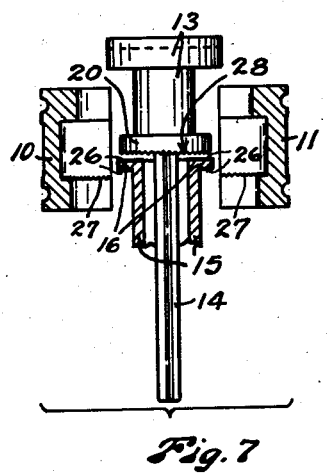
Fig. 7 is a detached elevation of a cam member used in the invention and showing, in section and in exploded relation, certain housing and clamp parts.

Flanges 16 on the upper end portions of the tubular clamping members 15 are supported within the housing members 10 and 11. These flanges 16 are preferably serrated to provide relatively fine teeth 26 on both their bottom and top sides, see Fig. 7. These teeth 26 cooperate with corresponding teeth or serrations 27 and 28, Fig. 7, on the housing members 10 and 11 and on a flange 20 of the plug member 13. A spring 17 yieldingly urges said teeth or serrations 27 and 28 into engagement with teeth 26 on the frame flanges 16, see Fig. 4. This arrangement prevents drifting and loosening of the cam 14 when the parts are in clamping position but will allow the cam to be retracted with a tool, such as a screw driver, to loosen the clamping device.

Preferably the two tubular gripping members 15 are of one piece of metal connected by a member 18 and tapered at 19 just above said member 18 to facilitate insertion in holes. However these two members 15 may be separate pieces.

Figure 1:
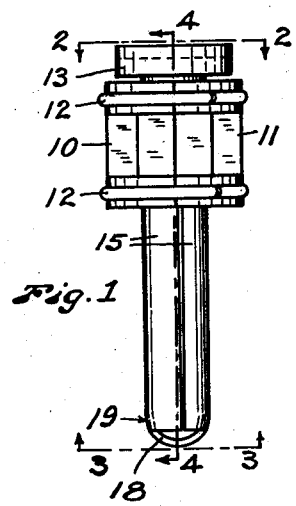
Figure 2:
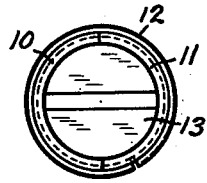
Figure 4:
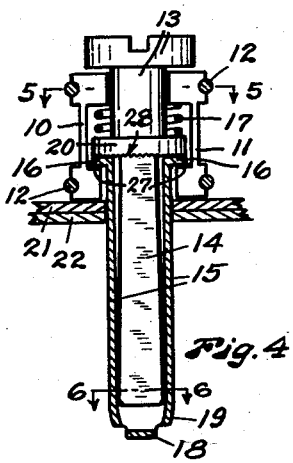
Fig. 4 is a longitudinal sectional view of the same taken substantially on broken line 4—4 of Fig. 1, showing parts in elevation and showing the device inserted in holes in two overlapping sheets of metal.
Figure 3:
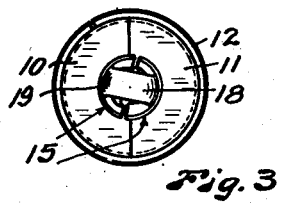
Figure 5:
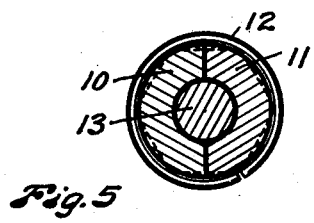
Fig. 5 is a sectional view taken substantially on broken line 5—5 of Fig. 4.

The cam member 14 is tapered and is slightly wider at its bottom end. When this cam member is in the position shown in Fig. 6, the tube members 15 can be passed through holes of standard size in a plurality of sheets 21 and 22 of metal as shown in Fig. 4. If the cam is then turned in a clockwise direction as respects the showing on Fig. 6, it will expand the tube members and cause them to bind in the holes and secure the pieces of sheet metal together with the holes in accurate alignment. The pieces 21 and 22 of sheet metal can be pressed against the end of the housing 10—11 if desired so that the device will hold them in close face to face relation. The taper of the cam member 14 swells the tube members outwardly more toward their outer ends than toward the housing 10—11 and this provides a taper device binding in the holes in the pieces of sheet metal so as to accurately align the holes and at the same time secure the two or more pieces of sheet metal together.

Figure 8:
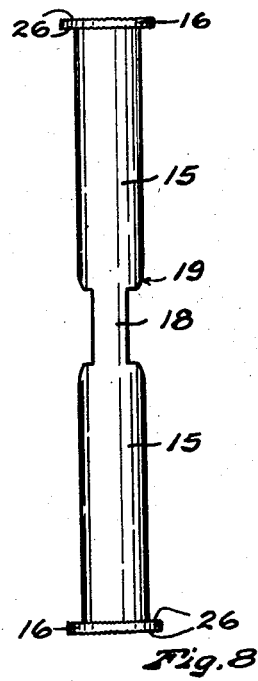
Fig. 8 is a detached elevation of a clamping member showing the same before it is bent into final shape.

When the two clamping members 15 are made in one piece, as shown in Fig. 8, they are preferably drop forged. If these two clamping members are to be in two separate pieces then the connecting member 18 is omitted. When made in two separate pieces the two clamping members 15 will function in substantially the same manner as when they are connected at their outer ends by the member 18. Obviously more than two clamping members may be used. For instance, I may use three clamping members and a three lobed cam.

Sheet metal fasteners which have hook or head means that must be passed through the holes in the plates and caused to engage with the surface of one of the plates usually must be of substantially smaller diameter than the holes through which they are to be passed. For this reason they can not be depended on to always accurately align the holes. Applicant's sheet metal fastener and hole aligner does not have any head or hook means but depends on the expansion of the clamping members 15 within the holes. Consequently applicant's device can be made so that it fits the holes closely, when collapsed, and it will only have to be expanded a few thousandths of an inch to bind securely within the holes thus accurately aligning said holes and, at the same time, firmly securing the sheets together.

In the use of this device, when the cam 14 is in the non-expanding position, as shown in Fig. 6, the gripping members 15 can easily be inserted in registering holes in sheets of material, such as the sheets 21 and 22 in Fig. 4. The sheets 21 and 22 will usually be positioned against the end of the housing 10—11 before the clamping or gripping members 15 are expanded. As the cam 14 is turned to expand the members 15 said members 15 flex slightly and are expanded on a slight taper. This accurately aligns the holes and firmly binds the sheets 21 and 22. When the cam 14 is angularly moved back into released position the clamping members 15 will contract and the fastener may be easily withdrawn from the holes.

The foregoing description and accompanying drawings clearly disclose what I now regard as a preferred embodiment of my invention but it will be understood that this disclosure is merely illustrative and that such changes in the device may be made as are fairly within the scope and spirit of the following claims.

I claim:

1. A fastener and hole aligner for insertion into registering holes of two or more overlapping sheets of material to align said holes and fasten said sheets together comprising a housing; a plurality of resilient clamping jaws carried by said housing and extending outwardly therefrom; an elongated cam element rotatively disposed within said jaws for expanding the same, said cam element being of relatively flat cross section and being slightly tapered to provide increasing width toward its outer end; and means connected with said cam element and extending to the exterior of said housing for rotating said cam element to expand said resilient clamping jaws into firm engagement with the walls of the holes in said overlapping sheets.

2. A fastener and hole aligner for insertion into registering holes of two or more overlapping sheets of material to align said holes and fasten said sheets together comprising a housing; a plurality of resilient clamping jaws carried by said housing and extending outwardly therefrom; an elongated cam element rotatively disposed within said jaws for expanding the same, said cam element being of relatively flat cross section and being slightly tapered to provide increasing width toward its outer end; means connected with said cam element and extending to the exterior of said housing for rotating said cam element; and detent means provided between said cam element and said jaws adapted to yieldingly hold the same against relative rotary movement, said detent means being yieldable when said cam element is positively rotated by exerting a turning force thereon.

3. A fastener and hole aligner for insertion into registering holes of two or more overlapping sheets of material to align said holes and fasten said sheets together comprising a housing; a plug member rotatively supported in said housing and having one end thereof accessible from the exterior of said housing whereby it may be rotatively moved; an elongated cam element rigid with said plug member and extending outwardly from said housing, said cam element being of relatively flat cross section and being slightly tapered to provide increasing width toward its outer end; and a plurality of resilient clamping jaws carried by said housing and extending around and substantially enclosing said cam element, said clamping jaws being insertable into registering holes in said sheets and having internal cam surfaces adapted to be engaged by said cam element whereby said clamping jaws will be expanded against the circumferential walls of said holes by said cam element when said cam element is rotated in one direction and will conform substantially to the taper of said cam element.

4. A fastener and hole aligner for insertion into registering holes of two or more overlapping sheets of material to align said holes and fasten said sheets together comprising a housing; a plug member rotatively supported in said housing and having one end thereof accessible from the exterior of said housing whereby it may be rotatively moved; an elongated cam element rigid with said plug member and extending outwardly from said housing, said cam element being of relatively flat cross section and being tapered to provide increasing width toward its outer end; and a plurality of resilient clamping jaws carried by said housing and extending around and substantially enclosing said cam element, said clamping jaws being insertable into registering holes in said sheets and having internal cam surfaces adapted to be engaged by the tapered edge portions of said cam element whereby rotation of said cam element in one direction will expand said jaws within said holes in said sheets.

5. A fastener and hole aligner for insertion into registering holes of two or more overlapping sheets of material to align said holes and fasten said sheets together, comprising a housing; a plug member rotatively supported in said housing and having one end thereof accessible from the exterior of said housing whereby said plug member may be rotatively moved; an elongated cam element rigid with said plug member and extending outwardly from said housing, said cam element being of relatively flat cross section and being of greater width than thickness and being expansively tapered in width toward its outer end; two resilient hollow clamping jaws positioned to form a tubular receptacle receiving said cam element, each of said jaws having a semi-cylindrical outer wall and having an inner wall that is spiral in shape cross sectionally considered, the inner walls of said two jaws cooperating with said cam element in the expanding of said jaws, said jaws each having one end portion positioned within said housing; flanges on the portions of said jaws that are positioned within said housing, said housing having shoulder means to receive and support said flanges whereby said jaws are secured to said housing; and an integral arcuate resilient member connecting the outer end portions of said jaws.

LOREN O. VINSON.